E. E. HAUER.
ROTARY MOTOR.
APPLICATION FILED JAN. 28, 1914.

1,102,749. Patented July 7, 1914.

Witnesses
Grover Ilgen
Floyd McKean

Inventor
Elmer E. Hauer
By Percy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

ROTARY MOTOR.

1,102,749.  Specification of Letters Patent.  Patented July 7, 1914.

Application filed January 28, 1914. Serial No. 815,069.

*To all whom it may concern:*

Be it known that I, ELMER E. HAUER, a citizen of the United States, residing at Springfield, in the county of Clark and State of Ohio, have invented certain new and useful Improvements in Rotary Motors, of which the following is a specification, reference being had therein to the accompanying drawings.

My invention relates to rotary motors and more particularly to a motor for driving tube cleaners that is adapted to travel through a tube with the cleaner, although it may be used for other purposes. A motor for the purpose named must run at a high speed and be limited in its dimensions by the size of the tube in which it is to operate. Furthermore the conditions of service vary according to the thicknes and hardness of the scale to be removed. My present motor is designed to meet conditions where the service is severe and the dimensions are necessarily limited; and to that end a bearing is provided in which one part has a sliding contact in its rotation about a stationary part, the contacting surfaces being inclined to the axis of the motor to both carry and take the end thrust of the rotary motor member; and further means are provided to take up the wear of the bearing. This bearing is preferably employed in combination with another bearing as will hereinafter more fully appear.

With these and other objects in view my invention consists of the constructions and combinations hereinafter described and set forth in the claims.

Figure 1:
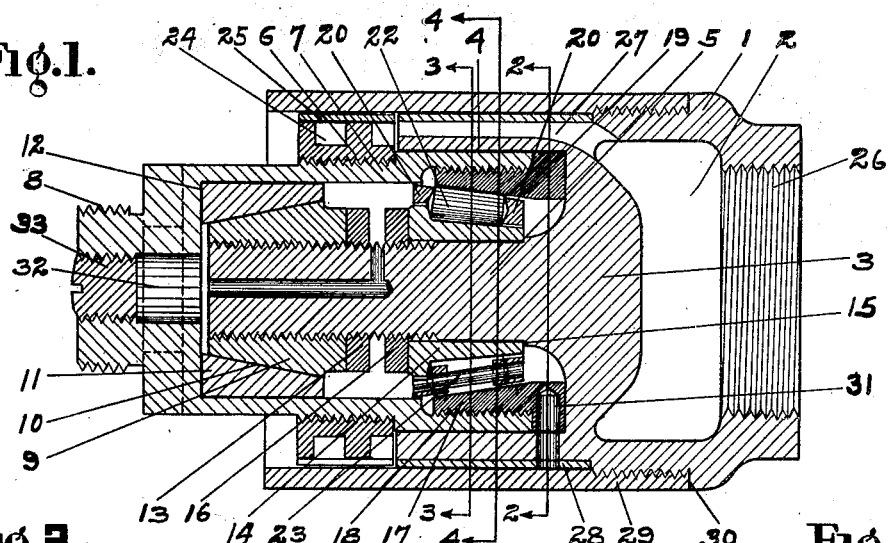
Figure 2:
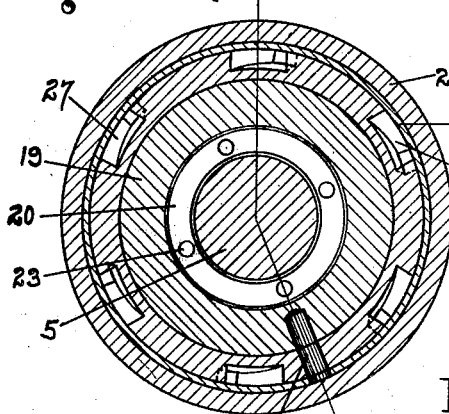
Figure 3:
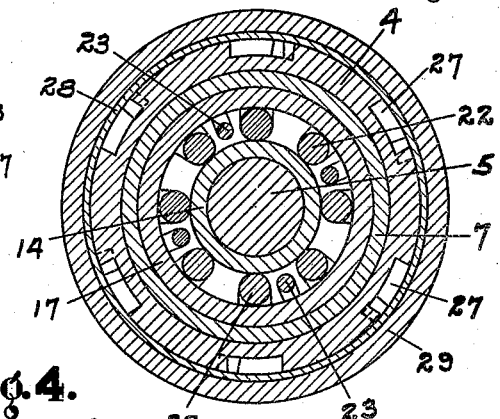
Figure 4:
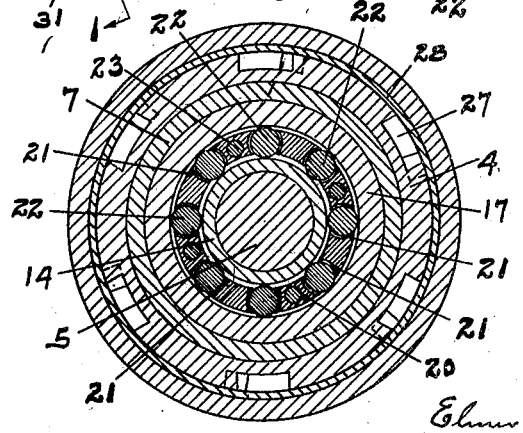

In the accompanying drawings which form a part of this specification Figure 1 is a longitudinal section on the line 1—1 of Fig. 2 and Figs. 2, 3 and 4 are cross-sections on the lines 2—2, 3—3 and 4—4 respectively of Fig. 1.

Like numerals represent the same parts in the several views.

In the drawings 1 represents a supply head having a chamber 2 and a wall 3 in front of said chamber. Said wall has a forwardly projecting cylinder 4 and a forwardly projecting shaft 5 and said wall, cylinder and shaft are preferably formed integral with said head.

A rotary motor member 6 has a forwardly and rearwardly extending cylinder 7 and the forwardly extending portion is provided with a screw-threaded end 8 to attach the tool to be driven.

The bearings are mounted upon the stationary shaft and disposed upon opposite sides of the rotary motor member within the respective ends of the cylinder of said member and I preferably employ bearings arranged to both carry and take the end thrust of the rotary motor member. One of these bearings which will be called a bush or cone bearing is shown as having a sleeve 9, the exterior of which has an inclined or cone-shaped surface 10 and is screw-threaded on the shaft 5; and a sleeve or bushing 11 is seated within the forward end of the cylinder 7 against a shoulder 12. Said sleeve or bushing 11 has an inclined or cone-shaped bore of the same inclination to the axis of the motor as the surface 10 of the sleeve 9 upon which, in its rotation, it has a sliding contact that both carries and takes the end thrust of the rotary motor member. The sleeve 9 can be adjusted on the shaft 5 to take up the wear of the bearing and a lock-nut 13 is provided to hold it in adjusted position. The other bearing which will be called a roller bearing is shown as having a sleeve or cone 14 on the shaft 5 seated against a shoulder 15 of the shaft and held in place by a lock-nut 16; and a sleeve or bushing 17 with screw-threads 18 to which the rear end of the cylinder 7 is secured, is further provided with a flange 19 seated against the front wall 3 of the head. Rings 20 have oppositely disposed circular recesses 21 in which the respective ends of rollers 22 are seated and arranged so that said rollers will extend beyond the inner and outer surfaces of the walls of said rings and ride upon the inclined outer surface of the sleeve cone 14 and upon the inner inclined surface of the sleeve bushing 17; and said rings are held in place by pins 23 tightened in openings in the respective rings so that when the rollers are in place they will be held in assembled position by said rings when the sleeves 14 and 17 are removed. It will be seen that this bearing also both carries and takes the end thrust of the rotary motor member; and the nut 16 holds the rotary motor member and both bearings in operative position.

The rotary motor member 6 is shown in the form of a turbine screw-threaded to the cylinder 7 and is provided with buckets 24 having a shroud 25. The supply head has a screw-threaded opening 26 to the chamber 2 for the attachment of a supply conduit; and ports or passages 27 having a shroud 28 lead from said chamber through the wall 3 and cylinder 4 and discharge into the buckets 24 of the rotary motor member. A shell 29 screw-threaded at its rear end against a shoulder 30 of the head forms a casing that projects beyond the rotary motor member as shown.

The motor is assembled by first placing the rear bearing and securing it in position by the nut 16, the shroud 28 already being in place; then screw the sleeve 9 and adjust nut 13 of the front bearing on the shaft; then the shrouded rotary motor member is secured in place on its cylinder with the sleeve bushing 11 in position within the cylinder; then screw the rear end of the cylinder to the sleeve 17 of the rear bearing; inserting a bar in the opening 31 to keep the sleeve from turning and secure the casing to the supply head. Lubricant is supplied to the bearings through an opening 32 having a screw-plug 33 to close the same.

The constructions shown but not claimed herein are claimed in my application Serial Number 782,439, filed Aug. 1st, 1913.

Having thus described my invention I claim:—

1. In a rotary motor, a supply head having a chamber with a wall in front of said chamber having ports therethrough and a central forwardly projecting shaft, said wall and shaft being formed integral with said head and a rotary motor member having a bearing on said shaft, said bearing comprising a cone secured to said shaft and a sleeve or bushing bored to fit and have a sliding contact with the surface of said cone, substantially as described.

2. In a rotary motor, a supply head having a chamber with a wall in front of said chamber having ports therethrough and a central forwardly projecting shaft, said wall and shaft being formed integrally with said head and a rotary motor member having a forwardly and rearwardly extending cylinder with removable bearings for the respective ends thereof mounted on said shaft and means to maintain the same thereon, one of said bearings being a bush bearing arranged to both carry and take the end thrust of said rotary motor member, substantially as described.

3. In a rotary motor, a supply head having a chamber with a wall in front of said chamber having ports therethrough and a central forwardly projecting shaft, said wall and shaft being formed integrally with said head and a rotary motor member having a forwardly and rearwardly extending cylinder with a bush bearing at one end and a roller bearing at the opposite end mounted on said shaft, said bush bearing being arranged to take the end thrust in one direction and said roller bearing being arranged to take the end thrust in the opposite direction, one of said bearings being secured to the shaft and arranged to hold the other bearing thereon and maintain said rotary motor member in operative position, substantially as described.

4. In a rotary motor, a supply head having a chamber with a wall in front of said chamber having ports therethrough and a central forwardly projecting shaft, said wall and shaft being formed integrally with said head and a rotary motor member having a bearing on said shaft, said bearing comprising two members one of which is secured to said shaft and the other having a sliding contact therewith at an inclination to the axis of the motor, substantially as described.

5. In a rotary motor, a supply head having a chamber with a wall in front of said chamber with ports therethrough and a central forwardly projecting shaft, said wall and shaft being formed integrally with said head, a rotary motor member having a forwardly and rearwardly extending cylinder with removable bearings for the respective ends thereof mounted on said shaft and means to adjust the front bearing to take up wear, substantially as described.

In testimony whereof I have hereunto affixed my signature in the presence of two witnesses.

ELMER E. HAUER.

Witnesses:
OLIVER H. HAUSE,
GROVER ILGEN.

---

Copies of this patent may be obtained for five cents each, by addressing the "Commissioner of Patents, Washington, D. C."